United States Patent
Perlman et al.

(10) Patent No.: US 10,298,551 B1
(45) Date of Patent: May 21, 2019

(54) PRIVACY-PRESERVING POLICY ENFORCEMENT FOR MESSAGING

(71) Applicant: EMC IP Holding Company LLC, Hopkinton, MA (US)

(72) Inventors: Radia Perlman, Redmond, WA (US); Xuan Tang, Hopkinton, MA (US); Charles Kaufman, Redmond, WA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 224 days.

(21) Appl. No.: 15/378,781

(22) Filed: Dec. 14, 2016

(51) Int. Cl.
| | |
|---|---|
| H04L 29/06 | (2006.01) |
| H04L 9/08 | (2006.01) |
| G06F 21/60 | (2013.01) |
| G06F 21/62 | (2013.01) |

(52) U.S. Cl.
CPC ........ *H04L 63/0428* (2013.01); *G06F 21/602* (2013.01); *G06F 21/6245* (2013.01); *H04L 9/0819* (2013.01); *H04L 63/20* (2013.01)

(58) Field of Classification Search
CPC . H04L 63/0428; H04L 9/0819; G06F 21/602; G06F 21/6245
See application file for complete search history.

(56) References Cited

U.S. PATENT DOCUMENTS

| | | |
|---|---|---|
| 6,577,734 B1 | 6/2003 | Etzel et al. |
| 6,883,100 B1 | 4/2005 | Elley et al. |
| 7,814,318 B1 | 10/2010 | Perlman et al. |
| 8,650,657 B1 | 2/2014 | Shankar et al. |

(Continued)

FOREIGN PATENT DOCUMENTS

| | | |
|---|---|---|
| EP | 1414181 A1 | 4/2004 |
| WO | 2016037048 A1 | 3/2016 |

OTHER PUBLICATIONS

Radia Perlman, "File System Design with Assured Delete," 14th Annual Network and Distributed System Security Symposium (NDSS), Feb.-Mar. 2007, 13 pages.

(Continued)

*Primary Examiner* — Kambiz Zand
*Assistant Examiner* — Tongoc Tran
(74) *Attorney, Agent, or Firm* — Ryan, Mason & Lewis, LLP (57) ABSTRACT

An apparatus in one embodiment comprises at least one processing device having a processor coupled to a memory. The processing device implements a messaging policy enforcement server that receives from a first client device metadata of an encrypted message to be sent from the first client device to a second client device. The received metadata comprises a first key utilized by the first client device to encrypt the message with the first key being encrypted utilizing a second key associated with the second client device. The messaging policy enforcement server processes the received metadata to determine one or more policies applicable to the encrypted message and to generate a further encrypted version of the encrypted first key utilizing one or more additional keys corresponding to the one or more policies. The further encrypted version of the encrypted first key is sent to the second client device in modified metadata of the encrypted message.

20 Claims, 5 Drawing Sheets

(56) References Cited

U.S. PATENT DOCUMENTS

| | | | |
|---|---|---|---|
| 2003/0002668 A1* | 1/2003 | Graunke | G06F 21/10 380/45 |
| 2005/0018853 A1 | 1/2005 | Lain et al. | |
| 2006/0010324 A1* | 1/2006 | Appenzeller | H04L 9/083 713/171 |
| 2006/0282666 A1 | 12/2006 | Kim | |
| 2006/0288232 A1 | 12/2006 | Ho et al. | |
| 2007/0226809 A1 | 9/2007 | Ellard | |
| 2007/0245410 A1 | 10/2007 | Perlman et al. | |
| 2008/0040775 A1 | 2/2008 | Hoff et al. | |
| 2009/0110191 A1* | 4/2009 | Sanvido | H04L 9/0822 380/44 |
| 2011/0158405 A1 | 6/2011 | Choi et al. | |
| 2011/0283113 A1* | 11/2011 | Moffat | G06F 21/602 713/189 |
| 2012/0284528 A1 | 11/2012 | Orovitz | |
| 2013/0104189 A1 | 4/2013 | Drako | |
| 2013/0305057 A1 | 11/2013 | Greco et al. | |
| 2013/0322621 A1 | 12/2013 | Yoon et al. | |
| 2014/0006802 A1 | 1/2014 | Cachin et al. | |
| 2014/0025963 A1 | 1/2014 | Subramanian | |
| 2014/0068257 A1* | 3/2014 | Burckard | G06F 21/6245 713/166 |
| 2014/0129830 A1* | 5/2014 | Raudaschl | G06F 21/6218 713/165 |
| 2014/0351605 A1 | 11/2014 | De Atley et al. | |
| 2014/0359309 A1 | 12/2014 | Cachin et al. | |
| 2015/0019870 A1 | 1/2015 | Patnala et al. | |
| 2015/0319192 A1* | 11/2015 | Cabrera | H04L 63/20 726/1 |
| 2016/0142381 A1 | 5/2016 | Shiraishi et al. | |
| 2016/0309331 A1* | 10/2016 | Moon | H04W 4/70 |

OTHER PUBLICATIONS

U.S. Appl. No. 14/752,012 filed in the name of R. Perlman et al. Jun. 26, 2015 and entitled "Storage System with Master Key Hierarchy Configured for Efficient Shredding of Stored Encrypted Data Items."

* cited by examiner

FIG. 3B

PRIVACY-PRESERVING POLICY ENFORCEMENT FOR MESSAGING

FIELD

The field relates generally to information security, and more particularly to techniques for providing secure messaging in an information processing system.

BACKGROUND

Conventional information processing systems are often configured to encrypt messages that are delivered from one device of the system to another device of the system. However, these conventional systems can be problematic, particularly with regard to the enforcement of policies relating to message distribution and access. For example, in some conventional systems, a server that distributes encrypted messages to client devices has access to the cryptographic keys and therefore can decrypt the messages. This adversely impacts the privacy of the users that send and receive the encrypted messages.

SUMMARY

Illustrative embodiments of the invention provide privacy-preserving policy enforcement for messaging, in which a server or a set of servers enforces various policies for recipient decryption of encrypted messages sent between client devices without the server or set of servers being able to decrypt the encrypted messages.

In one embodiment, an apparatus includes at least one processing device comprising a processor coupled to a memory. The processing device implements a messaging policy enforcement server configured to communicate with a plurality of client devices over a network. The messaging policy enforcement server receives from a first one of the client devices metadata of an encrypted message to be sent from the first client device to at least a second one of the client devices. The received metadata comprises a first key utilized by the first client device to encrypt the message with the first key being encrypted utilizing a second key associated with the second client device.

The messaging policy enforcement server is configured to process the received metadata to determine one or more policies applicable to the encrypted message to be sent from the first client device to the second client device and to generate a further encrypted version of the encrypted first key utilizing one or more additional keys corresponding to the one or more policies. The further encrypted version of the encrypted first key is sent to the second client device in modified metadata of the encrypted message.

The metadata of the encrypted message received in the messaging policy enforcement server from the first device in some embodiments further comprises policy information identifying at least a subset of the one or more policies applicable to the encrypted message. The modified metadata may similarly include policy information identifying the one or more policies applicable to the encrypted message.

The messaging policy enforcement server may be configured to authenticate the second client device in conjunction with a decryption request received from that device, to receive the modified metadata comprising policy information and the further encrypted version of the encrypted first key from the second client device, and to determine if the second client device satisfies the one or more policies. If the second client device satisfies the one or more policies, the messaging policy enforcement server decrypts the further encrypted version to obtain the encrypted first key, and makes the encrypted first key accessible to the second client device so as to allow the second client device to use the second key to decrypt the encrypted first key in order to obtain the first key.

The second client device by obtaining the first key in the manner described above can decrypt the encrypted message from the first client device. However, the messaging policy enforcement server does not have access to the first and second keys and therefore cannot decrypt the encrypted message.

The one or more policies may illustratively include respective policies that limit accessibility of the encrypted first key to only the client devices of those users having at least one of a particular citizenship, a particular age level, a particular employment level, a particular security level and a particular confidentiality level. Numerous additional or alternative policies as well as combinations of multiple such policies may be used.

Alternative embodiments can utilize a set of messaging policy enforcement servers rather than a single messaging policy enforcement server. For example, a plurality of messaging policy enforcement servers can collectively enforce a plurality of distinct policies utilizing respective ones of a plurality of additional keys.

In some embodiments, encryption utilizing the one or more additional keys corresponding to the one or more policies is implemented by the first client device rather than by the messaging policy enforcement server. For example, the first client device may be configured to determine the one or more policies applicable to the encrypted message to be sent from the first client device to the second client device and to generate the further encrypted version of the encrypted first key utilizing the one or more additional keys corresponding to the one or more policies. The further encrypted version of the encrypted first key is then sent to the second client device in metadata of the encrypted message.

These and other illustrative embodiments include, without limitation, systems, apparatus, methods and computer program products comprising processor-readable storage media.

BRIEF DESCRIPTION OF THE DRAWINGS

FIGS. 2 and 3 are flow diagrams showing example processes of privacy-preserving policy enforcement for messaging in illustrative embodiments. FIG. 2 includes two distinct flow diagrams denoted as FIGS. 2A and 2B. FIG. 3 similarly includes two distinct flow diagrams denoted as FIGS. 3A and 3B.

DETAILED DESCRIPTION

Illustrative embodiments of the present invention will be described herein with reference to exemplary information processing systems and associated processing devices. It is to be appreciated, however, that embodiments of the invention are not restricted to use with the particular illustrative system and device configurations shown. Accordingly, the term "information processing system" as used herein is intended to be broadly construed, so as to encompass, for example, a wide variety of different processing platforms including cloud-based processing platforms that include combinations of virtual and physical compute, network and storage resources.

Figure 1:
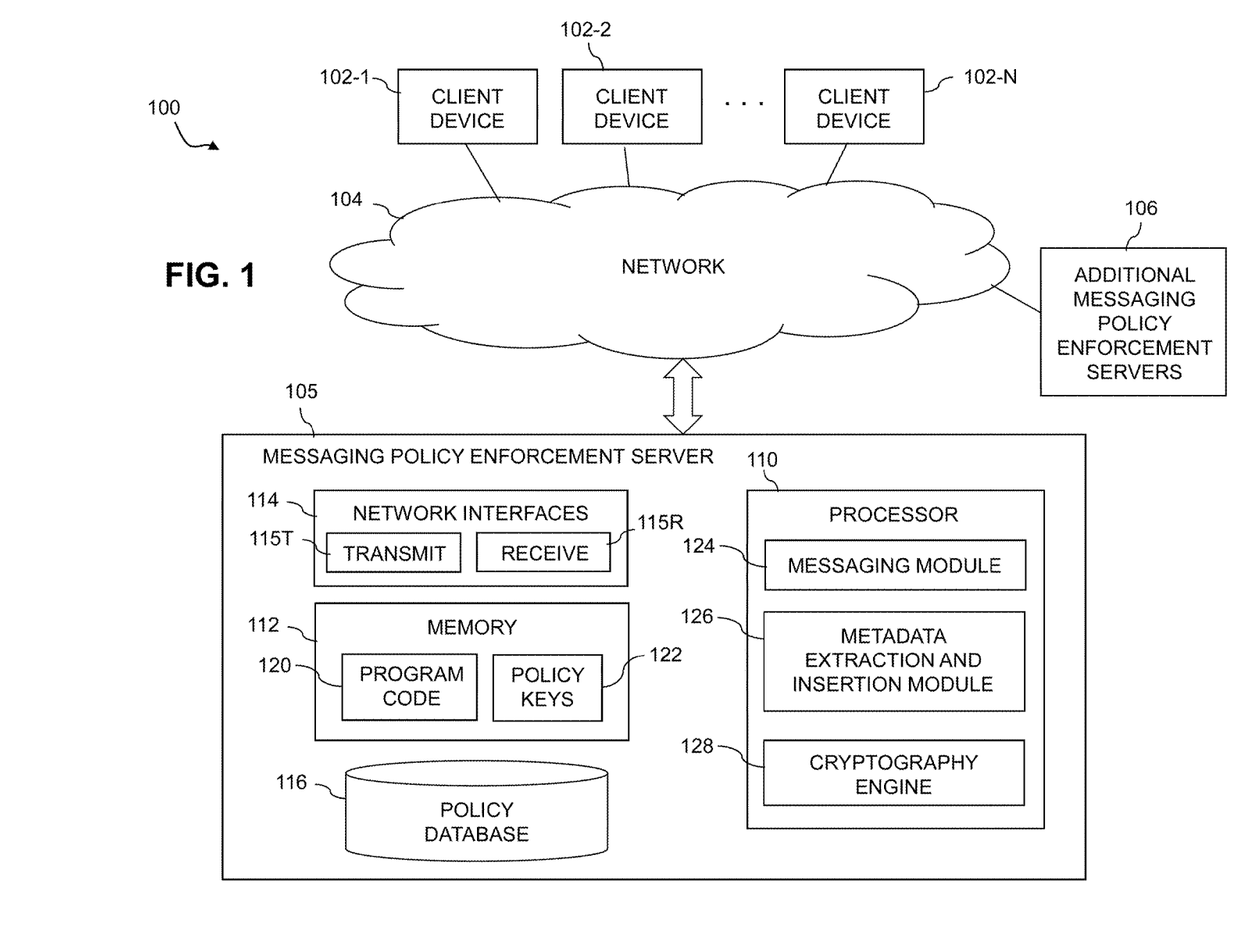
FIG. 1 is a block diagram of an information processing system comprising a messaging policy enforcement server that implements privacy-preserving policy enforcement for messaging between client devices in an illustrative embodiment.

FIG. 1 shows an information processing system 100 configured in accordance with an illustrative embodiment of the invention. The information processing system 100 comprises a plurality of client devices 102-1, 102-2, . . . 102-K, collectively referred to herein as client devices 102. The client devices 102 are coupled to a network 104. Also coupled to the network 104 is a first messaging policy enforcement server 105 and multiple additional messaging policy enforcement servers 106. Each of the additional messaging policy enforcement servers 106 may be configured in a manner similar to that illustrated in the figure for server 105.

The client devices 102 may comprise, for example, mobile telephones, laptop computers, tablet computers, desktop computers or other types of devices capable of sending and receiving encrypted messages over the network 104. Such devices are examples of what are more generally referred to herein as "processing devices."

The client devices 102 in some embodiments comprise respective computers associated with a particular company, organization or other enterprise. In addition, at least portions of the information processing system 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the information processing system 100, including a wide area network (WAN), a local area network (LAN), a satellite network, a telephone or cable network, a cellular network, a wireless network such as a WiFi or WiMAX network, or various portions or combinations of these and other types of networks. The information processing system 100 in some embodiments therefore comprises combinations of multiple different types of networks each comprising processing devices configured to communicate using IP or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniB and, Gigabit Ethernet or Fibre Channel. Numerous alternative networking arrangements are possible in a given embodiment, as will be appreciated by those skilled in the art.

In the present embodiment, the messaging policy enforcement server 105 is configured to communicate over the network 104 with the client devices 102 and possibly with the additional messaging policy enforcement servers 106. In other embodiments, the messaging policy enforcement servers need not communicate with one another but instead may be configured to communicate only with the client devices 102.

The messaging policy enforcement server 105 in the FIG. 1 embodiment is assumed to be implemented using at least one processing device. Each such processing device generally comprises at least one processor and an associated memory, and implements one or more functional modules for controlling certain features of the messaging policy enforcement server 105.

More particularly, the messaging policy enforcement server 105 in this embodiment comprises a processor 110 that interacts with a memory 112 and with a plurality of network interfaces 114. The processor 110 is assumed to be coupled to the memory 112 and to the network interfaces 114 via one or more signal buses or other interconnection mechanisms not explicitly shown in the figure.

The processor 110 illustratively comprises a microprocessor, a microcontroller, an application-specific integrated circuit (ASIC), a field-programmable gate array (FPGA) or other type of processing circuitry, as well as portions or combinations of such circuitry elements.

The memory 112 illustratively comprises random access memory (RAM), read-only memory (ROM) or other types of memory, in any combination. The memory 112 and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, a storage array or an integrated circuit containing memory, as well as a wide variety of other types of computer program products. The term "article of manufacture" as used herein should be understood to exclude transitory, propagating signals.

The network interfaces 114 allow the messaging policy enforcement server 105 to communicate over the network 104 with the client devices 102 and the additional messaging policy enforcement servers 106, and illustratively comprises transmit components 115T and receive components 115R of one or more transceivers.

The messaging policy enforcement server 105 further comprises a policy database 116. The policy database 116 stores policy information associated with messaging policies relating to message distribution between client devices 102.

The policy database 116 in the present embodiment is illustratively implemented as part of one or more storage systems coupled to or otherwise associated with one or more processing devices that are utilized to implement the messaging policy enforcement server 105. Such storage systems can comprise any of a variety of different types of storage including by way of example network-attached storage (NAS), storage area networks (SANs), direct-attached storage (DAS) and distributed DAS, as well as combinations of these and other storage types, including but not limited to flash storage, storage arrays, software-defined storage, cloud storage and object-based storage.

Although shown as being arranged internally to the messaging policy enforcement server 105, the policy database 116 in some embodiments can be at least in part external to the messaging policy enforcement server 105. Also, at least portions of the policy database 116 can additionally or alternatively be implemented as an in-memory database utilizing the memory 112 of the messaging policy enforcement server 105.

The memory 112 in this embodiment further comprises program code 120 and policy keys 122. The program code 120 illustratively comprises software that is utilized by the processor 110 to implement privacy-preserving policy enforcement functionality within the messaging policy enforcement server 105. The policy keys 122 illustratively comprise respective cryptographic keys for implementing respective policies for distribution of encrypted messages between the client devices 102 within the system 100. Such policy keys are examples of what are more generally referred to herein as "additional keys" other than a first key used to encrypt a given message and a second key utilized to encrypt the first key.

The processor 110 further comprises a messaging module 124, a metadata extraction and insertion module 126 and a cryptography engine 128.

It is assumed for further description of this embodiment that a first client device 102-1 would like to send an encrypted message to a second client device 102-2. Other ones of the client devices 102 can of course exchange encrypted messages using techniques similar to those described below for the first and second client devices 102-1 and 102-2.

The first client device 102-1 utilizes a first key to encrypt the message to be sent to the second client device 102-2. The first client device 102-1 also encrypts the first key utilizing a second key associated with the second client device 102-2. The first client device 102-1 inserts the encrypted first key in metadata of the encrypted message, and sends at least the metadata to the messaging policy enforcement server 105. It may also send the encrypted message to the messaging policy enforcement server 105 along with the metadata.

The first and second keys comprise respective cryptographic keys. By way of example, the second key may comprise a public key of the second client device 102-2 where the second client device 102-2 maintains the corresponding secret key. Alternatively, the second key may comprise a secret key shared between the first and second client devices 102-1 and 102-2. In either case, if the second client device 102-2 is able to obtain the encrypted first key, it can decrypt that encrypted first key to obtain the first key that will allow it to decrypt the encrypted message from the first client device 102-1. The messaging policy enforcement server 105 determines whether or not the second client device 102-2 will have access to the encrypted first key, in a manner to be described below.

In some embodiments, asymmetric keys are used, such that different keys are used for encryption and decryption. Other embodiments can use symmetric keys, such that the same key used for encryption is also used for decryption. Various combinations of asymmetric and symmetric keys can be used. For example, some of the additional policy keys applied to an encrypted first key in metadata of a given message may comprise asymmetric keys while others comprise symmetric keys. The term "key" as used herein is intended be broadly construed so as to encompass these and other arrangements of cryptographic information suitable for securing access to a message. The term "message" as used herein is also intended to be broadly construed and is not restricted to any particular format or formats.

The messaging module 124 is configured to facilitate the exchange of messages and associated metadata between the messaging policy enforcement server 105 and the client devices 102. In this embodiment, the messaging policy enforcement server 105 receives at least the metadata of the encrypted message from the first client device 102-1 via the messaging module 124. As noted above, the server 105 may additionally receive the encrypted message along with the metadata.

The metadata received by the messaging policy enforcement server 105 in this embodiment is assumed to comprise not only the encrypted first key but also policy information identifying one or more policies applicable to the encrypted message. It is also possible that one or more such policies may be identified in other ways. For example, in some embodiments the received metadata of the encrypted message comprises information characterizing the message, such that the messaging policy enforcement server 105 can determine at least a subset of the one or more policies applicable to the encrypted message based at least in part on the information characterizing the message. Accordingly, the policies applied by the messaging policy enforcement server 105 in a given embodiment can include not only one or more policies specified by the message sender, but also one or more policies configured into the server 105, or a combination of these or other policies of different types.

The messaging policy enforcement server 105 in the present embodiment utilizes the metadata extraction and insertion module 126 to extract the encrypted first key and the corresponding policy information from the metadata received from the first client device 102-1. The server 105 utilizes the extracted policy information to determine one or more policies applicable to the encrypted message to be sent from the first client device 102-1 to the second client device 102-2. The server 105 then utilizes the cryptography engine 128 to generate a further encrypted version of the encrypted first key utilizing one or more additional keys corresponding to the one or more policies.

A given one of the additional keys may comprise, for example, a public key of the messaging policy enforcement server 105, or a secret key of the messaging policy enforcement server 105.

In some embodiments, the one or more policies comprise multiple policies corresponding to respective ones of the additional keys. In such an embodiment, the cryptography engine 128 of the messaging policy enforcement server 105 is configured to generate the further encrypted version of the encrypted first key by repeated wrapping of the encrypted first key over a plurality of distinct wrapping iterations with each such wrapping iteration using a different one of the additional keys.

For example, some embodiments can utilize hierarchical key arrangements of the type described in U.S. patent application Ser. No. 14/752,012, filed Jun. 26, 2015 and entitled "Storage System with Master Key Hierarchy Configured for Efficient Shredding of Stored Encrypted Data Items," which is incorporated by reference herein. These and numerous other key wrapping techniques and alternative cryptographic techniques can be used in illustrative embodiments disclosed herein to ensure that each of a plurality of policies must be satisfied by a recipient before an encrypted message is readable by that recipient.

The further encrypted version of the encrypted first key is sent to the second client device 102-2 in modified metadata of the encrypted message. For example, the messaging policy enforcement server 105 can utilize its metadata extraction and insertion module 126 to insert the further encrypted version of the encrypted first key into the metadata previously received from the first client device 102-1 in order to generate the modified metadata. The modified metadata is additionally assumed to comprise policy information identifying the one or more policies applicable to the encrypted message.

In an embodiment in which the messaging policy enforcement server 105 receives the encrypted message from the first client device 102-1 for forwarding to the second client device 102-2, it utilizes messaging module 124 to send the encrypted message and the modified metadata comprising the policy information and the further encrypted version of the encrypted first key to the second client device 102-2.

In an embodiment in which the messaging policy enforcement server 105 does not receive the encrypted message from the first client device 102-1 but instead only receives the original metadata from that device, it utilizes messaging module 124 to send the modified metadata back to the first client device 102-1. The first client device 102-1 then forwards the encrypted message and the modified metadata to the second client device 102-2.

The second client device 102-2 once in possession of the encrypted message and the modified metadata then interacts with the message policy enforcement server 105 to obtain the encrypted first key.

For example, the messaging policy enforcement server 105 is illustratively configured to authenticate the second client device 102-2 in conjunction with a decryption request received from that device, to receive the modified metadata comprising policy information and the further encrypted version of the encrypted first key from the second client device 102-2, to determine if the second client device satisfies the one or more policies, and if the second client device 102-2 satisfies the one or more policies, to decrypt the further encrypted version to obtain the encrypted first key.

The messaging policy enforcement server 105 then makes the encrypted first key accessible to the second client device 102-2 so as to allow the second client device 102-2 to use the second key to decrypt the encrypted first key in order to obtain the first key. The second client device 102-2 by obtaining the first key can decrypt the encrypted message from the first client device 102-1. The messaging policy enforcement server 105 does not have access to the first and second keys and therefore cannot decrypt the encrypted message.

The one or more policies illustratively include respective policies that limit accessibility of the encrypted first key to only those users having at least one of a particular citizenship, a particular age level, a particular employment level, a particular security level and a particular confidentiality level. Numerous other types of policies can be enforced.

For example, the second client device 102-2 may be associated with a particular one of a plurality of users on a distribution list for the encrypted message. In such an embodiment, the messaging policy enforcement server 105 is illustratively configured to send the modified metadata comprising the further encrypted version of the encrypted first key to the second client device 102-2 and to one or more additional client devices 102 associated with one or more respective other ones of the users on the distribution list.

As another example, the original received metadata of the encrypted message may comprise information identifying a desired global expiration time of the encrypted message. In such an embodiment, the messaging policy enforcement server 105 is illustratively configured to establish an expiration time for at least one of the one or more additional keys based at least in part on the desired global expiration time. After the established expiration time, the messaging policy enforcement server 105 destroys the corresponding at least one of the one or more additional keys so as to ensure that the further encrypted version of the encrypted first key cannot be decrypted after the established expiration time.

As more detailed illustrations of various embodiments of the type described above, assume that a first user ("Alice") associated with first client device 102-1 would like to send a secure message to a second user ("Bob") associated with second client device 102-2. Actions attributed below to Alice or Bob should be understood to more generally encompass actions performed by their respective client devices 102-1 and 102-2.

Alice composes a message to Bob, and encrypts the message with a randomly-selected first key K. The first key K may be specific to the particular message to be sent to Bob. Alice then encrypts or "wraps" the first key K with a key of the desired recipient Bob and inserts the wrapped first key into metadata of the encrypted message. For example, Alice can encrypt K with a public key of Bob in order to obtain the encrypted first key, which is denoted {K}Bob to indicate key K wrapped with Bob's key.

Alice can also designate particular policies to be applied to the message, such as citizenship, age level, employment level, security level, confidentiality level and global expiration time. As indicated above, the global expiration time specifies how long the server 105 will allow the message to be decryptable. These policies can be designated by inserting information identifying the policies into the metadata.

Other examples of policies that can be designated by Alice include various handling policies such as whether the recipient is allowed to make copies, or whether the recipient must delete the message after viewing it for a period of time (e.g., a few seconds). These and other handling policies that are enforced at the recipient device can involve utilization of known digital rights management (DRM) techniques.

In some embodiments, the messaging policy enforcement server 105 performs the additional key wrapping operations for each of the policies designated by Alice. Alternatively, Alice may have access to keys for one or more of her designated policies and can therefore perform key wrapping iterations for those policies.

Alice then sends the encrypted message and its metadata to the messaging policy enforcement server 105. Alternatively, Alice in some embodiments sends only the metadata to the server 105.

The metadata illustratively comprises the encrypted first key {K}Bob as well as policy information identifying the particular policies designated by Alice, and possibly additional information providing various characteristics of the message. The latter information can be used by the messaging policy enforcement server 105 to determine additional policies to be enforced for the message. Numerous other types of metadata configurations can be used in other embodiments.

The messaging policy enforcement server 105 upon receipt of the metadata from Alice determines which policies to enforce, and enforces them by further encrypting {K}Bob utilizing an additional key for each policy. For example, assume that there is an additional key C for a policy requiring that the message recipient be a U.S. citizen. If this were the only policy to be enforced, the server 105 would replace the encrypted first key {K}Bob with the further encrypted version {{K}Bob}C in modifying the metadata of the encrypted message. However, if there was another policy to be enforced, such as a policy requiring that the message recipient be a company employee, and having a corresponding additional key E, the server 105 would perform another iteration of key wrapping to obtain {{{K}Bob}C}E and then update the metadata accordingly. The additional keys C and E utilized by the server 105 in enforcing corresponding policies are examples of policy keys 122.

It should be noted that the policy keys 122 in some embodiments include secret keys, such that the same messaging policy enforcement server 105 or 106 that performs the encryption for a given iteration of key wrapping will also perform the corresponding decryption. The key of the recipient Bob could also be a secret key. For example, Alice and Bob can predetermine a shared secret key. Alternatively, such a shared secret key could be established using a protocol such as SKIP ("Simple Key Management for IP"). In an arrangement of this type, the individual public keys of Alice and Bob are Diffie-Hellman keys given by $g^A$ mod p and $g^B$ mod p, respectively. The message in this case contains Alice's individual public key $g^A$ mod p and the first key K utilized to encrypt the message is encrypted utilizing a shared secret key $g^{AB}$ mod p instead of Bob's individual public key $g^A$ mod p.

The encrypted message and its modified metadata are sent to the recipient Bob. For example, Alice can send the encrypted message to the messaging policy enforcement server 105 such that the server 105 forwards the encrypted message and the modified metadata to Bob. Alternatively, Alice may send only the metadata to the server 105 such that the server 105 returns the modified metadata to Alice. Alice then sends the encrypted message and the modified metadata to Bob.

In either case, Bob upon receipt of the modified metadata authenticates to the messaging policy enforcement server 105, and provides the server 105 with the modified metadata. The server 105 will then determine whether Bob meets the policy criteria (e.g., U.S. citizen), and unwrap the policy key(s). But the server 105 can at most unwrap until reaching the encrypted first key {K}Bob, and therefore cannot decrypt the encrypted first key {K}Bob to obtain the first key K and cannot read the encrypted message.

As a more specific example, assume that Alice sends the encrypted message to Bob without knowing whether or not Bob has the correct security clearance to read the message. She encrypts the message for Bob, and then specifies the required security clearance as policy information in the metadata. The encrypted first key {K}Bob is further wrapped with the policy key for the security clearance policy. This wrapping is illustratively performed by the messaging policy enforcement server 105, but can alternatively be performed by Alice if for example she has knowledge of a public key for that policy. When Bob receives the message and its associated metadata, he cannot read the message unless he can prove to the server 105 that he is authorized to read it. If the server 105 determines that Bob is indeed authorized to read the message, the server 105 unwraps the further wrapping that was previously performed using the security clearance policy key, and returns the encrypted first key {K}Bob to Bob, so that he is thereby enabled to read the message.

In some embodiments, no single messaging policy enforcement server 105 or 106 knows all of the additional keys for all of the designated policies, or knows which individuals meet the criteria of each such policy. Accordingly, it may be necessary for each of multiple servers 105 or 106 in a set of such servers to perform policy enforcement and associated key unwrapping for the particular policy or policies that it controls.

For example, each server in the set can perform its key unwrapping and then forward the remaining wrapped portion to another server in the set until all the policy-based key unwrapping is completed such that the encrypted first key {K}Bob is obtained and can be returned to Bob. Alternatively, each server in the set can perform its key unwrapping and then return the remaining wrapped portion to Bob with instructions to contact the next server in the set for further unwrapping. In such an arrangement, Bob is redirected to different servers 105 or 106 for unwrapping different policy keys.

If a policy regarding a global expiration time is established, the messaging policy enforcement server 105 or 106 that enforces that policy will destroy the corresponding additional key at the appropriate time, after which it will no longer be possible for even the desired recipient Bob to read the message.

As a more particular example of an arrangement of this type, assume that Alice wishes the message to be readable within the system for only one week such that any recipients who do not read the message within one week will never be able to read the message. Alice can then send the metadata comprising the encrypted first key {K}Bob to the messaging policy enforcement server 105 with a specified global expiration time. The server 105 encrypts {K}Bob with a corresponding additional policy key T. The server 105 then destroys the key T at the desired global expiration time.

As mentioned previously, there may be multiple desired recipients for a given message rather than a single desired recipient such as Bob. For example, assume that Alice would like to send the encrypted message to each of a set of members on a distribution list ("LIST") rather than to just Bob. In some implementations of this type, there may be a public key for LIST, and all of the members of LIST may be configured with the corresponding secret key. Alice can then encrypt the first key K with the public key of LIST to obtain the encrypted first key {K}LIST, and then proceeds as previously described. As one possible alternative, the members of LIST may not know the secret key. In this case, each member of LIST authenticates to a group server G that can verify the members. More particularly, each member authenticates to G and sends the metadata to G such that G can unwrap {K}LIST and provide the first key K to an authorized group member. The group server G is therefore illustratively a final server that a given LIST member such as Bob interacts with after all other policy-based key unwrapping is performed by one or more other servers 105 or 106.

In the above distribution list examples, Alice can send a message to a distribution list that may include individuals that are not authorized to read the message. Although all members of the distribution list may receive the encrypted message, only those that are authorized will be able to read the message.

If a particular individual is determined by a server or set of servers not to be authorized to read the message, that individual might receive a notification indicating that he or she is not authorized to read the message. Alternatively, the corresponding client device may be configured to learn the policy information of its user and utilize such information to display or otherwise process only those messages that its user will be able to read.

Aspects of the foregoing examples involving sender Alice and recipient Bob are implemented utilizing the messaging module 124, metadata extraction and insertion module 126 and cryptography engine 128 of the processor 110 in the messaging policy enforcement server 105, and in some cases similar components implemented in one or more of the additional messaging policy enforcement servers 106.

It is to be appreciated that the particular arrangement of modules 124, 126 and 128 illustrated in the processor 110 of the FIG. 1 embodiment is presented by way of example only, and alternative arrangements can be used in other embodiments. For example, the functionality associated with the modules 124, 126 and 128 in other embodiments can be combined into a single module, or separated across a larger number of modules. As another example, multiple distinct processors can be used to implement different ones of the modules 124, 126 and 128 or portions thereof.

At least portions of the modules 124, 126 and 128 may be implemented at least in part in the form of software comprising program code 120 stored in memory 112 and executed by processor 110.

In the embodiment described above, the messaging policy enforcement server 105 enforces policies relating to encrypted message distribution and access by ensuring that the recipients must meet the applicable policies in order to read a given encrypted message. This allows a sender to safely send messages without knowing in advance whether or not all individuals on a given message distribution list meet particular specified policies such as U.S. citizenship or company employment.

Moreover, the messaging policy enforcement server 105 provides this advantageous policy enforcement functionality without itself being able to read the encrypted messages, thereby overcoming the disadvantages of conventional arrangements in which a server that distributes encrypted messages to client devices has access to the cryptographic keys and therefore can decrypt the messages. An attacker that compromises the messaging policy enforcement server 105 will still be unable to read the encrypted messages. Only the intended recipients can read the message, and then only if the policies are satisfied.

The arrangement described above therefore permits the messaging policy enforcement server 105 to enforce various policies for recipient decryption of encrypted messages sent between client devices 102 without the messaging policy enforcement server 105 being able to decrypt the encrypted messages. Accordingly, the privacy of the system users associated with respective client devices 102 is preserved.

Another example of an arrangement of this type will be described below in conjunction with FIGS. 2A and 2B.

As indicated previously, alternative embodiments can utilize a set of messaging policy enforcement servers rather than a single messaging policy enforcement server. For example, a plurality of messaging policy enforcement servers can collectively enforce a plurality of distinct policies utilizing respective ones of a plurality of additional keys. The plurality of messaging policy enforcement servers illustratively includes the server 105 and one or more of the additional messaging policy enforcement servers 106.

In one example of such an arrangement, each of the plurality of messaging policy enforcement servers is configured to authenticate the second client device 102-2 in conjunction with a decryption request received from that device, to receive at least a portion of the further encrypted version of the encrypted first key from the second client device 102-2, to determine if the second client device 102-2 satisfies at least one of the plurality of distinct policies, and if the second client device 102-2 satisfies the one or more policies of the plurality of distinct policies, to decrypt the portion of the further encrypted version of the encrypted first key received from the second client device 102-2 such that the plurality of messaging policy enforcement servers collectively make the encrypted first key accessible to the second client device 102-2. This allows the second client device 102-2 to use the second key to decrypt the encrypted first key in order to obtain the first key. As indicated previously, the second client device 102-2 by obtaining the first key can decrypt the encrypted message from the first client device 102-1.

In some embodiments, encryption utilizing the one or more additional keys corresponding to the one or more policies is implemented by the first client device 102-1 rather than by the messaging policy enforcement server 105. For example, the first client device 102-1 may be configured to determine the one or more policies applicable to the encrypted message to be sent from the first client device 102-1 to the second client device 102-2 and to generate the further encrypted version of the encrypted first key utilizing the one or more additional keys corresponding to the one or more policies. The further encrypted version of the encrypted first key is then sent from the first client device 102-1 to the second client device 102-2 in metadata of the encrypted message. An example of such an arrangement will be described in more detail below in conjunction with FIGS. 3A and 3B.

It should also be understood that the particular set of elements shown in FIG. 1 for implementing privacy-preserving policy enforcement for messaging in information processing system 100 is presented by way of illustrative example only, and in other embodiments additional or alternative elements may be used. Thus, another embodiment may include additional or alternative systems, devices and other network entities, as well as different arrangements of modules and other components.

Illustrative embodiments of processes for privacy-preserving policy enforcement for messaging in the information processing system 100 will now be described in detail with reference to the flow diagrams of FIGS. 2 and 3.

In the FIG. 2 embodiment, policy-based key wrapping relating to an encrypted message to be sent from a first client device 102-1 to a second client device 102-2 is performed by the messaging policy enforcement server 105 or a set of servers comprising server 105 and one or more of the additional messaging policy enforcement servers 106.

The FIG. 3 embodiment illustrates one possible alternative arrangement in which the policy-based key wrapping is performed by the first client device 102-1 rather than the messaging policy enforcement server 105 or a set of servers comprising server 105 and one or more of the additional servers 106.

It is to be understood that these particular processes are only examples, and additional or alternative processes can be carried out in other embodiments.

Figure 2A:
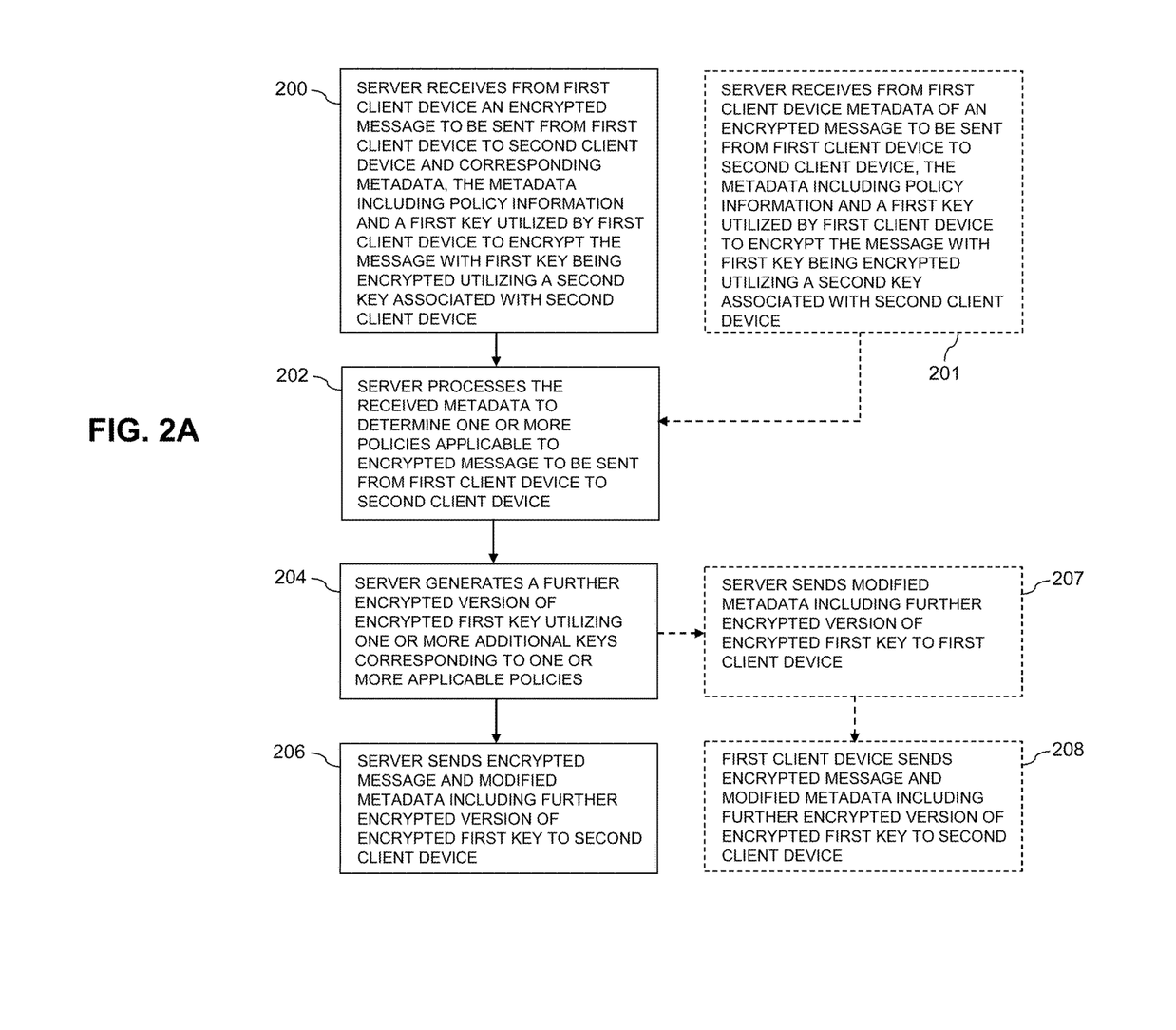

Referring now to FIG. 2A, the process as illustrated includes steps 200, 202, 204 and 206, all of which are assumed to be performed by the messaging policy enforcement server 105, also referred to as simply the "server" in the figure. The process also includes optional alternative steps 201, 207 and 208 shown in dashed outline. Step 201 is an alternative to step 200, and steps 207 and 208 are an alternative to step 206.

In step 200, the messaging policy enforcement server 105 receives from the first client device 102-1 an encrypted message to be sent from first client device 102-1 to the second client device 102-2 and corresponding metadata. The metadata includes policy information and a first key utilized by the first client device 102-1 to encrypt the message with first key being encrypted utilizing a second key associated with the second client device 102-2.

Alternatively, in step 201 the messaging policy enforcement server 105 receives from the first client device 102-1 metadata of an encrypted message to be sent from the first client device 102-1 to the second client device 102-2. The metadata includes policy information and a first key utilized by the first client device 102-1 to encrypt the message with first key being encrypted utilizing a second key associated with second client device 102-2.

In step 202, the messaging policy enforcement server 105 processes the received metadata to determine one or more policies applicable to the encrypted message to be sent from the first client device 102-1 to the second client device 102-2.

In step 204, the messaging policy enforcement server 105 generates a further encrypted version of the encrypted first key utilizing one or more additional keys corresponding to one or more applicable policies.

In step 206, the messaging policy enforcement server 105 sends the encrypted message and the modified metadata including the further encrypted version of the encrypted first key to the second client device 102-2.

Alternatively, in step 207 the messaging policy enforcement server 105 sends the modified metadata including the further encrypted version of the encrypted first key to the first client device 102-1. The first client device 102-1 in step 208 then sends the encrypted message and the modified metadata including the further encrypted version of the encrypted first key to the second client device 102-2.

Figure 2B:
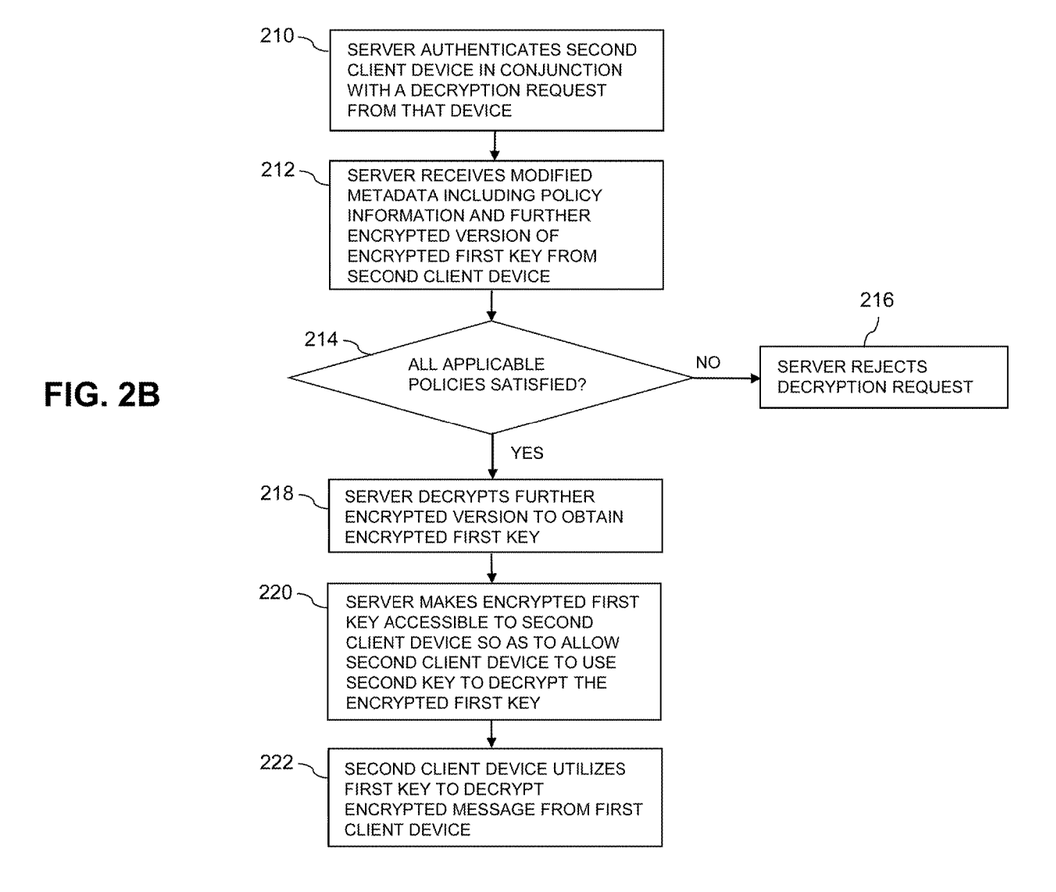

FIG. 2B illustrates the interactions between the second client device 102-2 and the messaging policy enforcement server 105 after the second client device 102-2 is in possession of the modified metadata and the encrypted message. At least the modified metadata is sent to the second client device 102-2 by the messaging policy enforcement server 105. The process as shown includes steps 210 through 222. Steps 210, 212, 214, 216, 218 and 220 are assumed to be performed by the messaging policy enforcement server 105, again referred to as simply the "server" in the figure. Step 222 is performed by the second client device 102-2.

In step 210, the messaging policy enforcement server 105 authenticates the second client device 102-2 in conjunction with a decryption request from that device.

In step 212, the messaging policy enforcement server 105 receives the modified metadata including policy information and the further encrypted version of the encrypted first key from the second client device 102-2.

In step 214, the messaging policy enforcement server 105 determines if all of the applicable policies are satisfied by the second client device 102-2. If at least one of the policies is not satisfied, the server 105 rejects the decryption request in step 216. Otherwise, all applicable policies are satisfied and the process moves to step 218.

In step 218, the messaging policy enforcement server 105 decrypts the further encrypted version of the encrypted first key in order to obtain the encrypted first key.

In step 220, the messaging policy enforcement server 105 makes the encrypted first key accessible to the second client device 102-2 so as to allow the second client device 102-2 to decrypt the encrypted first key.

In step 222, the second client device 102-2 utilizes the first key to decrypt the encrypted message from the first client device 102-1.

Figure 3A:
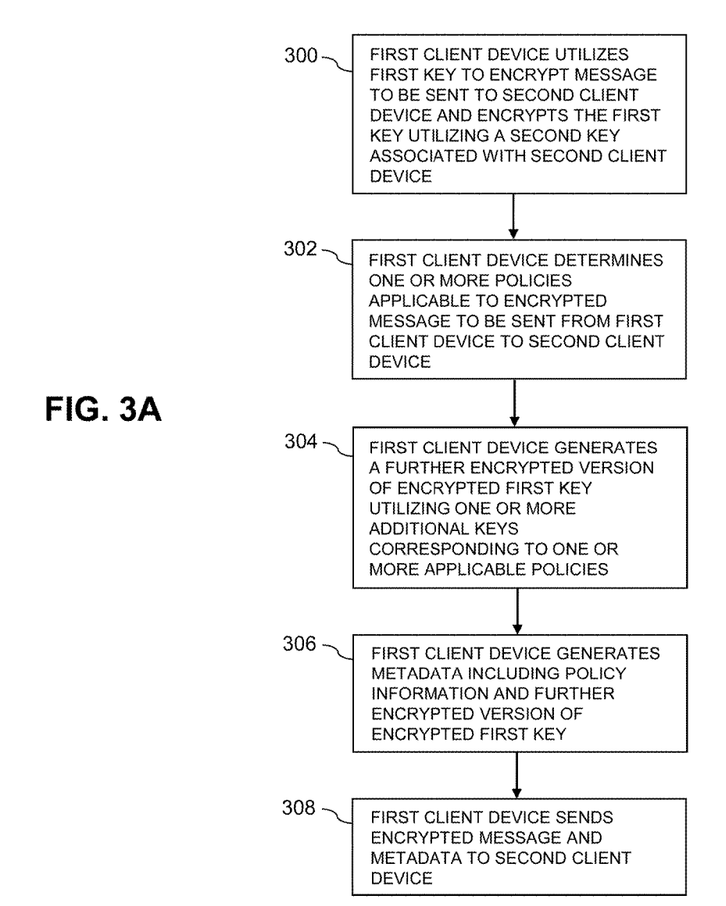

Referring now to FIG. 3A, the process as shown include steps 300 through 308, all of which are assumed to be performed by the first client device 102-1.

In step 300, the first client device 102-1 utilizes the first key to encrypt the message to be sent to the second client device 102-2 and encrypts the first key utilizing a second key associated with the second client device 102-2.

In step 302, the first client device 102-1 determines one or more policies applicable to the encrypted message to be sent from the first client device 102-1 to the second client device 102-2.

In step 304, the first client device 102-1 generates a further encrypted version of the encrypted first key utilizing one or more additional keys corresponding to the one or more applicable policies.

In step 306, the first client device 102-1 generates metadata including policy information and the further encrypted version of the encrypted first key.

In step 308, the first client device 102-1 sends the encrypted message and the metadata to the second client device 102-2.

Figure 3B:
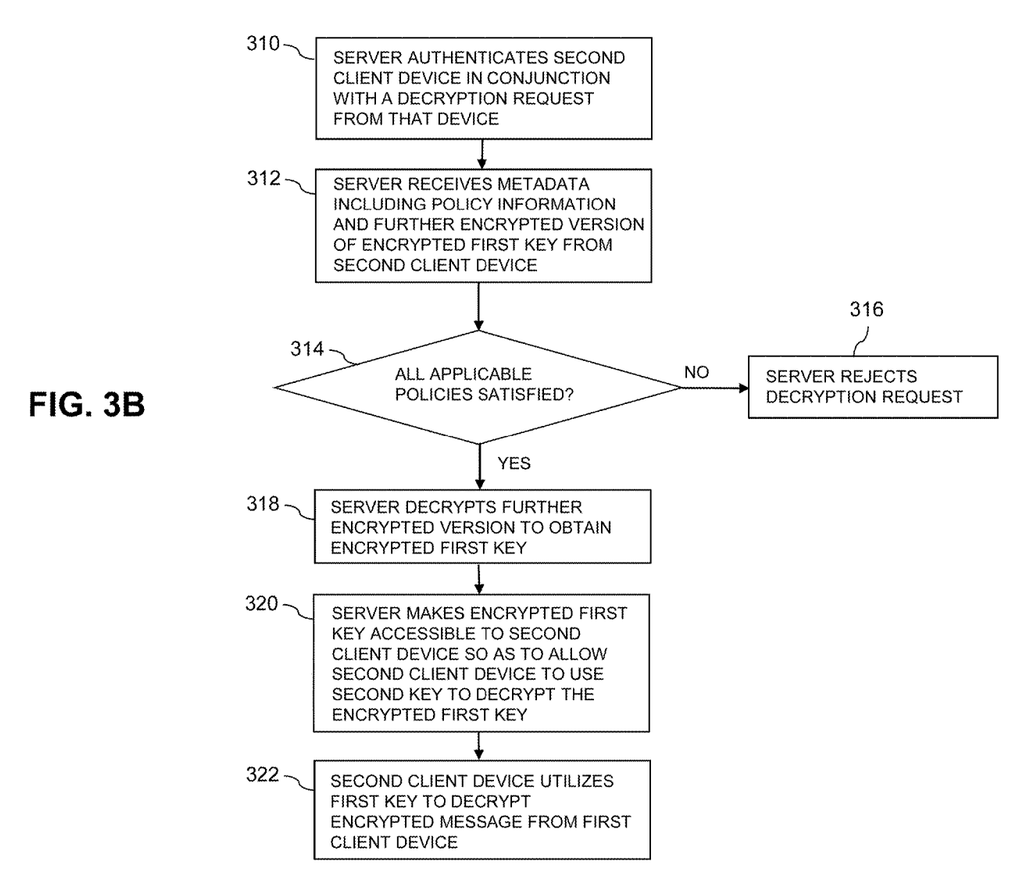

FIG. 3B illustrates the interactions between the second client device 102-2 and the messaging policy enforcement server 105 after the second client device 102-2 is in possession of the metadata and the encrypted message, both of which are assumed to be sent to the second client device 102-2 by the first client device 102-1. The process as shown includes steps 310, 312, 314, 316, 318, 320 and 322, which are substantially the same as respective steps 210, 212, 214, 216, 218, 220 and 222 previously described in conjunction with FIG. 2B and therefore will not be separately described.

In the FIG. 3B embodiment, the metadata of the encrypted message as transmitted by the first client device 102-1 to the second client device 102-2 is not modified by the messaging policy enforcement server 105 and is therefore referred to as "metadata" rather than as "modified metadata" as in FIG. 2B.

The particular processing operations and other system functionality described in conjunction with the flow diagrams of FIGS. 2 and 3 are presented by way of illustrative example only, and should not be construed as limiting the scope of the invention in any way. Alternative embodiments can use other types of processing operations to implement privacy-preserving policy enforcement for messaging. For example, certain steps may be performed at least in part concurrently with one another rather than serially. As additional examples, one or more of the process steps may be repeated periodically for different messaging instances, and multiple such processing instances can be performed in parallel with one another for different messages within a given information processing system.

Also, functionality such as that described in conjunction with the flow diagrams of FIGS. 2 and 3 can be implemented at least in part in the form of one or more software programs stored in program code 120 of memory 112 and executed by processor 110. As mentioned previously, a storage device or other memory having executable program code of one or more software programs embodied therein is an example of what is more generally referred to herein as a "processor-readable storage medium."

The foregoing example processes are illustrative only, and should not be viewed as limiting the scope of any particular embodiment in any way. Those skilled in the art will appreciate that numerous alternative privacy-preserving policy enforcement arrangements can be used in other embodiments.

Illustrative embodiments provide a number of significant advantages relative to conventional arrangements. For example, one or more such embodiments allow a server or a set of servers to enforce one or more policies relating to a given message without the server or set of servers being able to read the message. Such a server or set of servers is configured to ensure that only authorized recipients can read the message while also preserving the privacy of the sender and recipients in the message contents.

Some embodiments allow a sender to send a message to multiple individuals on a distribution list without the sender needing to know whether or not each individual is in fact authorized to read the message. Instead, the sender can designate one or more policies to be enforced with regard to the message, and the server or set of servers ensures that only those particular individuals on the distribution list that actually satisfy the one or more policies will be able to read the message.

A wide variety of different policies can be specified for a given message, including a policy that implements a global expiration time after which an encrypted message will become unreadable even by desired recipients.

In some embodiments, one or more policies can be specified by the sender inserting identifiers of those policies into policy information that is part of the metadata of a given message. Those policies can be supplemented in some embodiments by one or more other policies that are determined by a messaging policy enforcement server from characteristics of the message or other information.

It is to be appreciated that the foregoing advantages are illustrative of advantages provided in certain embodiments, and need not be present in other embodiments.

The information processing systems disclosed herein are illustratively implemented using one or more processing platforms, examples of which will be now be described in greater detail. A given such processing platform comprises at least one processing device comprising a processor coupled to a memory.

In some embodiments, portions of an information processing system as disclosed herein illustratively comprise cloud infrastructure. The cloud infrastructure in some embodiments comprises a plurality of containers implemented using container host devices. More particularly, the cloud infrastructure in one or more illustrative embodiments comprises container-based virtualization infrastructure configured to implement Docker containers or other types of Linux containers (LXCs).

The cloud infrastructure may additionally or alternatively comprise other types of virtualization infrastructure such as virtual machines implemented using a hypervisor. An example of a commercially available hypervisor platform that may be used to implement portions of the information processing system 100 in an illustrative embodiment is the VMware® vSphere® which may have an associated virtual infrastructure management system such as the VMware® vCenter™. The underlying physical machines may comprise one or more distributed processing platforms that include one or more storage systems.

The cloud infrastructure mentioned above may represent at least a portion of one processing platform. Another example of such a processing platform is a plurality of processing devices which communicate with one another over a network. The network may comprise any type of network, including, by way of example, a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an ASIC, an FPGA or other type of processing circuitry, as well as portions or combinations of such circuitry elements. The memory may comprise RAM, ROM or other types of memory, in any combination. The memory and other memories disclosed herein should be viewed as illustrative examples of what are more generally referred to as "processor-readable storage media" storing executable program code of one or more software programs.

As indicated above, articles of manufacture and other computer program products comprising such processor-readable storage media are considered embodiments of the present invention.

Also included in the processing device is network interface circuitry, which is used to interface the processing device with the network and other system components, and may comprise conventional transceivers.

As another processing platform example, portions of a given processing platform in some embodiments can comprise converged infrastructure such as VxRail™, VxRack™ or Vblock® converged infrastructure commercially available from VCE, the Virtual Computing Environment Company, an EMC Federation Company.

The particular processing platforms described above are presented by way of example only, and a given information processing system such as system 100 may include additional or alternative processing platforms, as well as numerous distinct processing platforms in any combination, with each such platform comprising one or more computers, servers, storage devices or other processing devices.

Processing devices and other information processing system components can communicate with one another using a variety of different communication protocols and associated communication media.

As indicated previously, components of an information processing system as disclosed herein can be implemented at least in part in the form of one or more software programs stored in memory and executed by a processor of a processing device.

It should again be emphasized that the above-described embodiments of the invention are presented for purposes of illustration only. Many variations and other alternative embodiments may be used. For example, the disclosed techniques are applicable to a wide variety of other types of information processing systems and associated processing devices. Also, the particular features of the illustrative embodiments of FIGS. 1-3 can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
   at least one processing device comprising a processor coupled to a memory;
   the processing device implementing a messaging policy enforcement server configured to communicate with a plurality of client devices over a network;
   wherein the messaging policy enforcement server receives from a first one of the client devices metadata of an encrypted message to be sent from the first client device to at least a second one of the client devices;
   the received metadata comprising a first key utilized by the first client device to encrypt the message with the first key being encrypted utilizing a second key associated with the second client device;
   the messaging policy enforcement server being configured to process the received metadata to determine one or more policies applicable to the encrypted message to be sent from the first client device to the second client device and to generate a further encrypted version of the encrypted first key utilizing one or more additional keys corresponding to the one or more policies;

the one or more additional keys comprising at least a first policy key utilized by the messaging policy enforcement server to enforce a first policy relating to access of the second client device to the message;

wherein the messaging policy enforcement server enforces the first policy by generating the further encrypted version of the encrypted first key utilizing the first policy key but does not have access to the first and second keys and therefore cannot decrypt the encrypted message; and wherein the further encrypted version of the encrypted first key is sent to the second client device in modified metadata of the encrypted message.

2. The apparatus of claim 1 wherein the received metadata of the encrypted message further comprises policy information identifying at least a subset of the one or more policies applicable to the encrypted message.

3. The apparatus of claim 1 wherein the modified metadata further comprises policy information identifying the one or more policies applicable to the encrypted message.

4. The apparatus of claim 3 wherein the messaging policy enforcement server is configured:
to authenticate the second client device in conjunction with a decryption request received from that device;
to receive the modified metadata comprising policy information and the further encrypted version of the encrypted first key from the second client device;
to determine if the second client device satisfies the one or more policies;
if the second client device satisfies the one or more policies, to decrypt the further encrypted version to obtain the encrypted first key; and
to make the encrypted first key accessible to the second client device so as to allow the second client device to use the second key to decrypt the encrypted first key in order to obtain the first key;
wherein the second client device by obtaining the first key can decrypt the encrypted message from the first client device.

5. The apparatus of claim 1 wherein the messaging policy enforcement server is configured:
to receive the encrypted message with the received metadata comprising the encrypted first key from the first client device; and
to send the encrypted message and the modified metadata comprising the further encrypted version of the encrypted first key to the second client device.

6. The apparatus of claim 1 wherein the messaging policy enforcement server is configured to send the modified metadata comprising the further encrypted version of the encrypted first key to the first client device so as to allow the first client device to send the encrypted message and the modified metadata comprising the further encrypted version of the encrypted first key to the second client device.

7. The apparatus of claim 1 wherein the second key comprises one of:
a public key of the second client device; and
a secret key shared between the first and second client devices.

8. The apparatus of claim 1 wherein a given one of the additional keys comprises one of:
a public key of the messaging policy enforcement server; and
a secret key of the messaging policy enforcement server.

9. The apparatus of claim 1 wherein the second client device is associated with a particular one of a plurality of users on a distribution list for the encrypted message and the modified metadata comprising the further encrypted version of the encrypted first key is sent to the second client device and to one or more additional client devices associated with one or more respective other ones of the users on the distribution list.

10. The apparatus of claim 1 wherein the one or more policies include respective policies that limit accessibility of the encrypted first key to only those users having at least one of a particular citizenship, a particular age level, a particular employment level, a particular security level and a particular confidentiality level.

11. The apparatus of claim 1 wherein the received metadata of the encrypted message further comprises information identifying a desired global expiration time of the encrypted message and wherein the messaging policy enforcement server is configured to establish an expiration time for at least one of the one or more additional keys based at least in part on the desired global expiration time and further wherein after the established expiration time the messaging policy enforcement server destroys the corresponding at least one of the one or more additional keys so as to ensure that the further encrypted version of the encrypted first key cannot be decrypted after the established expiration time.

12. The apparatus of claim 1 wherein the received metadata of the encrypted message further comprises information characterizing the message and wherein the messaging policy enforcement server is configured to determine at least a subset of the one or more policies applicable to the encrypted message based at least in part on the information characterizing the message.

13. The apparatus of claim 1 wherein the one or more policies comprise multiple policies corresponding to respective ones of the additional keys and wherein the messaging policy enforcement server is configured to generate the further encrypted version of the encrypted first key by repeated wrapping of the encrypted first key over a plurality of distinct wrapping iterations with each such wrapping iteration using a different one of the additional keys.

14. The apparatus of claim 1 wherein the messaging policy enforcement server is one of a plurality of messaging policy enforcement servers that collectively enforce a plurality of distinct policies utilizing respective ones of a plurality of additional keys.

15. The apparatus of claim 14 wherein each of the plurality of messaging policy enforcement servers is configured:
to authenticate the second client device in conjunction with a decryption request received from that device;
to receive at least a portion of the further encrypted version of the encrypted first key from the second client device;
to determine if the second client device satisfies at least one of the plurality of distinct policies; and
if the second client device satisfies the one or more policies of the plurality of distinct policies, to decrypt the portion of the further encrypted version of the encrypted first key received from the second client device such that the plurality of messaging policy enforcement servers collectively make the encrypted first key accessible to the second client device so as to allow the second client device to use the second key to decrypt the encrypted first key in order to obtain the first key;

wherein the second client device by obtaining the first key can decrypt the encrypted message from the first client device.

16. An apparatus comprising:
at least one processing device comprising a processor coupled to a memory;
the processing device implementing a first client device of a plurality of client devices configured to communicate with a messaging policy enforcement server over a network;
wherein the first client device utilizes a first key to encrypt a message to be sent to a second one of the client devices and encrypts the first key utilizing a second key associated with the second client device;
the first client device being configured to determine one or more policies applicable to the encrypted message to be sent from the first client device to the second client device and to generate a further encrypted version of the encrypted first key utilizing one or more additional keys corresponding to the one or more policies;
the one or more additional keys comprising at least a first policy key utilized to enforce a first policy relating to access of the second client device to the message;
wherein the first policy is enforced by generating the further encrypted version of the encrypted first key utilizing the first policy key; and
wherein the further encrypted version of the encrypted first key is sent to the second client device in metadata of the encrypted message.

17. A method comprising:
receiving metadata of an encrypted message to be sent from a first client device to at least a second client device, the received metadata comprising a first key utilized by the first client device to encrypt the message with the first key being encrypted utilizing a second key associated with the second client device;
processing the received metadata to determine one or more policies applicable to the encrypted message to be sent from the first client device to the second client device; and
generating a further encrypted version of the encrypted first key utilizing one or more additional keys corresponding to the one or more policies;
the one or more additional keys comprising at least a first policy key utilized to enforce a first policy relating to access of the second client device to the message;
wherein the first policy is enforced by generating the further encrypted version of the encrypted first key utilizing the first policy key;
wherein the further encrypted version of the encrypted first key is sent to the second client device in modified metadata of the encrypted message; and
wherein the receiving, processing and generating are performed by at least one processing device comprising a processor coupled to a memory.

18. The method of claim 17 further comprising:
authenticating the second client device in conjunction with a decryption request received from that device;
receiving the modified metadata comprising the further encrypted version of the encrypted first key from the second client device;
determining if the second client device satisfies the one or more policies;
if the second client device satisfies the one or more policies, decrypting the further encrypted version to obtain the encrypted first key; and
making the encrypted first key accessible to the second client device so as to allow the second client device to use the second key to decrypt the encrypted first key in order to obtain the first key;
wherein the second client device by obtaining the first key can decrypt the encrypted message from the first client device.

19. A non-transitory processor-readable storage medium having stored therein program code of one or more software programs, wherein the program code when executed by at least one processing device causes said processing device:
to receive metadata of an encrypted message to be sent from a first client device to at least a second client device, the received metadata comprising a first key utilized by the first client device to encrypt the message with the first key being encrypted utilizing a second key associated with the second client device;
to process the received metadata to determine one or more policies applicable to the encrypted message to be sent from the first client device to the second client device; and
to generate a further encrypted version of the encrypted first key utilizing one or more additional keys corresponding to the one or more policies;
the one or more additional keys comprising at least a first policy key utilized to enforce a first policy relating to access of the second client device to the message;
wherein the first policy is enforced by generating the further encrypted version of the encrypted first key utilizing the first policy key; and
wherein the further encrypted version of the encrypted first key is sent to the second client device in modified metadata of the encrypted message.

20. The processor-readable storage medium of claim 19 wherein the program code when executed by at least one processing device further causes said processing device:
to authenticate the second client device in conjunction with a decryption request received from that device;
to receive the modified metadata comprising the further encrypted version of the encrypted first key from the second client device;
to determine if the second client device satisfies the one or more policies;
if the second client device satisfies the one or more policies, to decrypt the further encrypted version to obtain the encrypted first key; and
to make the encrypted first key accessible to the second client device so as to allow the second client device to use the second key to decrypt the encrypted first key in order to obtain the first key;
wherein the second client device by obtaining the first key can decrypt the encrypted message from the first client device.

* * * * *